(12) United States Patent
Hosono et al.

(10) Patent No.: US 7,670,585 B2
(45) Date of Patent: Mar. 2, 2010

(54) METHOD FOR PREPARING ELECTROCONDUCTIVE MAYENITE TYPE COMPOUND

(75) Inventors: Hideo Hosono, Yokohama (JP); Katsuro Hayashi, Yokohama (JP); Sung Wng Kim, Yokohama (JP); Masahiro Hirano, Yokohama (JP); Satoru Narushima, Chiyoda-ku (JP); Setsuro Ito, Chiyoda-ku (JP)

(73) Assignees: Asahi Glass Company, Limited, Tokyo (JP); Tokyo Institute of Technology, Tokyo (JP)

(*) Notice: Subject to any disclaimer, the term of this patent is extended or adjusted under 35 U.S.C. 154(b) by 0 days.

(21) Appl. No.: 11/948,147

(22) Filed: Nov. 30, 2007

(65) Prior Publication Data

US 2008/0095688 A1    Apr. 24, 2008

Related U.S. Application Data

(63) Continuation of application No. PCT/JP2006/310808, filed on May 30, 2006.

(30) Foreign Application Priority Data

May 30, 2005   (JP)   ............................. 2005-157881

(51) Int. Cl.
    *C01F 7/16*   (2006.01)
(52) U.S. Cl. ........................ 423/600; 423/263; 423/277; 423/327.1; 423/331; 423/332; 423/593.1; 423/594.2; 423/594.4; 423/594.6; 423/596; 423/598; 423/599; 423/594.8; 423/594.9; 423/594.16
(58) Field of Classification Search ............ 423/594.16, 423/600, 594.9, 263, 277, 327.1, 331–332, 423/593.1, 594.2, 594.4, 594.6, 596, 598–599, 423/594.8
See application file for complete search history.

(56) References Cited

U.S. PATENT DOCUMENTS

2002/0172726 A1 * 11/2002 Hosono et al. ............. 424/688

2005/0053546 A1    3/2005  Hosono et al.
2005/0061657 A1 *  3/2005  Hosono et al. ............. 204/164
2006/0276326 A1   12/2006  Hosono et al.

FOREIGN PATENT DOCUMENTS

| JP | 2003226571 | * 12/2003 |
| JP | 2004-26608 | 1/2004 |
| WO | 01-079115 | 10/2001 |
| WO | 03-033406 | 4/2003 |
| WO | 2005-000741 | 1/2005 |

OTHER PUBLICATIONS

U.S. Appl. No. 11/948,053, filed Nov. 30, 2007, Hosono, et al.
F. M. Lea et al., "The Chemistry of Cement and Concrete", 2nd ed., p. 52, Edward Arnold & Co., London, 1956.
O. Yamaguchi et al., J. Am. Ceram. Soc. 1986, 69, C36, "New Compound in the System SrO-$Al_2O_3$".
Minoru Imaoka, Glass Handbook (compiled by Sakka, Takahashi, Sakaino), Asakura Publishing, 880 and 889 (1975).
Wenyan Li, et al., Journal of Non-Crystaline Solids 1999, 255 (2, 3), 199 "Nucleation and crystallization in calcium aluminate glasses".
SungWng Kim, et al., J. Am. Chem. Soc. 2005 127, 1370-1371 "Simple and Efficient Fabrication of Room Temperature Stable Electride: Melt-Solidification and Glass Ceramics".

* cited by examiner

*Primary Examiner*—Stanley Silverman
*Assistant Examiner*—James Fiorito
(74) *Attorney, Agent, or Firm*—Oblon, Spivak, McClelland, Maier & Neustadt, L.L.P.

(57) ABSTRACT

Provided is a method for preparing an electroconductive mayenite type compound with good properties readily and stably at low cost without need for expensive facilities, a reaction at high temperature and for a long period of time, or complicated control of reaction.

A method for preparing an electroconductive mayenite type compound comprises a step of subjecting a precursor to heat treatment, wherein the precursor contains Ca and/or Sr, and Al, a molar ratio of (a total of CaO and SrO:$Al_2O_3$) is from (12.6:6.4) to (11.7:7.3) as calculated as oxides, a total content of CaO, SrO and $Al_2O_3$ in the precursor is at least 50 mol %, and the precursor is a vitreous or crystalline material; and the method comprises a step of mixing the precursor with a reducing agent and performing the heat treatment of holding the mixture at 600-1,415° C. in an inert gas or vacuum atmosphere with an oxygen partial pressure of at most 10 Pa.

8 Claims, 1 Drawing Sheet

METHOD FOR PREPARING ELECTROCONDUCTIVE MAYENITE TYPE COMPOUND

TECHNICAL FIELD

The present invention relates to a method for preparing an electroconductive mayenite type compound.

BACKGROUND ART

A mayenite type compound has a typical composition of $12CaO \cdot 7Al_2O_3$ (hereinafter referred to as "C12A7") and a characteristic crystal structure composed of three-dimensionally linked voids (cages) with a diameter of about 0.4 nm. The framework of the cages has a positive electric charge and there are 12 cages per unit lattice. One sixth of the cages are occupied by oxygen ions in order to satisfy an electrically neutral condition of the crystal, and these oxygen ions are particularly called "free oxygen ions" because they have properties chemically different from those of the other oxygen ions constituting the framework. For the reason described above, the C12A7 crystal is denoted as $[Ca_{24}Al_{28}O_{64}]^{4+} \cdot 2O^{2-}$ (Non-patent Document 1).

Another known mayenite type compound is $12SrO \cdot 7Al_2O_3$ (hereinafter referred to as "S12A7"), and there also exists a mixed crystal compound of C12A7 and S12A7 with any mixing ratio of Ca and Sr (Non-patent Document 2).

Hosono et al. found that powder of the C12A7 crystal or its sintered product was heat-treated in an $H_2$ atmosphere to make clathrate $H^-$ ions in the cages, and then irradiated with ultraviolet light to make clathrate electrons in the cages, thereby inducing permanent electroconductivity at room temperature (Patent Document 1). The clathrate electrons are weakly bound to the cages and can freely move in the crystal, whereby electroconductivity is imparted to the C12A7 crystal of the mayenite type compound. However, the electroconductive mayenite type compound obtained by this method cannot include an enough amount of clathrate electrons, so that the electroconductivity cannot be sufficient.

Hosono et al. also found that when a C12A7 single crystal was subjected to a reducing treatment with an alkali metal vapor, the free oxygen ions in the cages were replaced by electrons to obtain a single-crystal electroconductive mayenite type compound (Patent Document 1). However, this method takes a long period of time to prepare the single crystal and to conduct the reducing treatment with calcium, and it is thus difficult to industrially apply the method.

Heretofore, it was known that a glass with the C12A7 composition could be obtained by the melting and rapid quenching method which was a usual production method of glass (Non-patent Document 3), and that the glass was reheated to crystallize, thereby preparing C12A7 of the mayenite type compound. Li et al. reported that a temperature required for re-crystallization of the C12A7 glass obtained by the melting and rapid quenching method in air was from 940 to 1,040° C.; a main crystal phase produced was the C12A7 crystal of the mayenite type compound; and a $CaAl_2O_4$ crystal was obtained as a by-product (Non-patent Document 4). The mayenite type compound thus obtained was, however, an insulator having free oxygens in the cages.

Hosono et al. found that a transparent glass prepared by melting the C12A7 crystal in a carbon crucible was subjected to a re-heating treatment at 1,600° C. and in an atmosphere with an oxygen partial pressure as extremely low as $10^{-11}$ Pa for one hour or at 1,000° C. in vacuum for 30 minutes to crystallize, thereby producing an electroconductive mayenite type compound (Non-patent Document 5). It was, however, difficult to industrially produce the compound at low cost and on a large scale by this method because the re-heating treatment required the high temperature to re-melt the glass and the atmosphere of extremely low oxygen partial pressure or vacuum, as described above.

Patent Document 1: WO2005-000741
Non-patent Document 1: F. M. Lea and C. H. Desch, The Chemistry of Cement and Concrete, 2nd ed., p. 52, Edward Arnold & Co., London, 1956.
Non-patent Document 2: O. Yamaguchi, A. Narai, K. Shimizu, J. Am. Ceram. Soc. 1986, 69, C36.
Non-patent Document 3: Minoru Imaoka, Glass Handbook (compiled by Sakka, Takahashi, Sakaino), Asakura Publishing, 880 pages (1975)
Non-patent Document 4: W. Li, B. S. Mitchell, J. Non-Cryst. Sol. 1999, 255 (2, 3), 199.
Non-patent Document 5: S. W. Kim, M. Miyakawa, K. Hayashi, T. Sakai, M. Hirano, and H. Hosono, J. Am. Chem. Soc., http://pubs.acs.org/journals/jacsat/, Web Release Date: 15 Jan. 2005).

DISCLOSURE OF THE INVENTION

Object to be Accomplished by the Invention

It is an object of the present invention is to overcome the above-mentioned drawbacks in the prior art. Namely, the conventional techniques required expensive facilities, control of complicated reaction conditions, and reaction at the high temperature or for the long period of time in order to prepare the electroconductive mayenite. Therefore, it was difficult to stably produce an electroconductive mayenite type compound with good properties at low cost.

Means to Accomplish the Object

The present inventors have conducted extensive and intensive studies in order to solve the above problems and accomplished the present invention with the following gists.

(1) A method for preparing an electroconductive mayenite type compound, which comprises a step of subjecting a precursor to heat treatment, wherein the precursor contains Ca and/or Sr, and Al, the molar ratio of (a total of CaO and SrO: $Al_2O_3$) is from (12.6:6.4) to (11.7:7.3) as calculated as oxides, the total content of CaO, SrO and $Al_2O_3$ in the precursor is at least 50 mol %, the precursor is a vitreous or crystalline material; and wherein the heat treatment is carried out by holding a mixture of the precursor and a reducing agent at 600-1,415° C. in an inert gas or vacuum atmosphere with an oxygen partial pressure of at most 10 Pa.

(2) The method according to the above (1), wherein the precursor is a mayenite type compound having a typical composition of $12CaO \cdot 7Al_2O_3$ and having a crystal structure composed of three-dimensionally linked voids (cages), or an isomorphous compound obtained by replacing part or all of Ca and Al in the mayenite type compound by another element.

(3) The method according to the above (1) or (2), wherein part of Al contained in the precursor is replaced by the same number of Si atoms or Ge atoms.

(4) The method according to any one of the above (1) to (3), wherein the precursor contains from 0 to 17 mol % in total of at least one member selected from the group consisting of Si, Ge and B as calculated as oxides; from 0 to 5 mol % in total of at least one member selected from the group consisting of Li, Na and K as calculated as oxides; from 0 to 10 mol % in total of at least one member selected from the group consisting of Mg and Ba as calculated as oxides; from 0 to 8 mol % in total of at least one member selected from the group consisting of (at least one rare earth element selected from the group consisting of Ce, Pr, Nd, Sm, Eu, Gd, Tb, Dy, Ho, Er, Tm and Yb) and (at least one transition metal element or typical metal element selected from the group consisting of Ti, V, Cr, Mn, Fe, Co, Ni and Cu) as calculated as oxides.

(5) The method according to any one of the above (1) to (4), wherein the precursor and the reducing agent are powders with an average particle size of at most 100 μm.

(6) The method according to the above (5), wherein the powder of the reducing agent is a powder of carbon; the precursor powder is mixed with the carbon powder in such an amount that the rate of a number of carbon atoms to a total number of Ca, Sr and Al atoms in the precursor powder becomes from 0.2 to 11%; and the mixture is subjected to the heat treatment.

(7) The method according to the above (5), wherein the powder of the reducing agent is a powder of a metal.

(8) The method according to the above (7), wherein the metal is aluminum and the inert gas contains at least Ar or He.

EFFECTS OF THE INVENTION

The preparation method of the present invention permits us to synthesize the electroconductive mayenite type compound with good electroconductivity in good yield, without need for expensive facilities or complicated control, and at low cost and on a large scale. In addition, the electroconductive mayenite type compound in the form of bulk, powder or film can be obtained at low cost. When the temperature is set to at most 1,415° C., the method does not go through a melt, and it becomes feasible to produce the compound in inexpensive equipment.

BEST MODE FOR CARRYING OUT THE INVENTION

Figure 1:
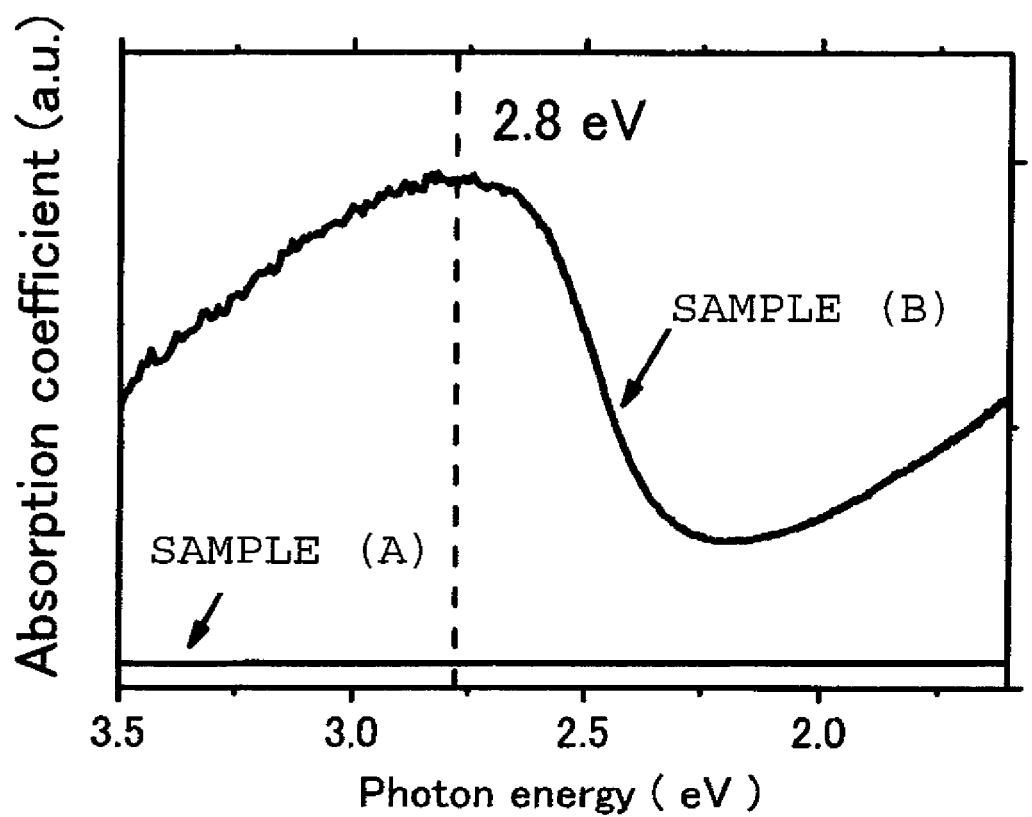
FIG. 1 is a graph showing photoabsorption spectra of a molded product sample (A) before the heat treatment and a molded product sample (B) after the heat treatment of the C12A7 powder in Example 1.

In the present invention, the following (1) to (4) may, for example, be used as a precursor for preparing an electroconductive mayenite type compound.

(1) An insulating mayenite type compound with a typical composition of $12CaO.7Al_2O_3$,
(2) an isomorphous compound obtained by replacing part or all of cations or anions in the framework or cages within the range where the crystal lattice framework and the cage structure formed by the framework of the above-mentioned insulating mayenite type compound are maintained (the insulating or electroconductive mayenite type compound with the typical composition of $12CaO.7Al_2O_3$ and the isomorphous compound resulting from replacement of cations or anions thereof will be referred to simply as "C12A7 compound"),
(3) a glass with a composition equivalent to that of the above-mentioned C12A7 compound, and
(4) a powder mixture of an oxide, a carbonate, a hydroxide, etc. mixed in a composition corresponding to the above-mentioned C12A7 compound (hereinafter referred to simply as "raw material mixture").

Specific examples of the C12A7 compound include mayenite type compounds and isomorphous compounds such as (1) to (4) below. However, the present invention is not limited thereto.

(1) Strontium aluminate $Sr_{12}Al_{14}O_{33}$ in which a part of the framework of the C12A7 compound or all cations are replaced, or calcium strontium aluminate $Ca_{12-x}Sr_xA_{14}O_{33}$ which is mixed crystals with an arbitrarily-changed mixing ratio of Ca and Sr,
(2) silicon-substituted mayenites $Ca_{12}Al_{10}Si_4O_{35}$,
(3) compounds in which free oxygens in the cages are replaced by anions such as $OH^-$, $F^-$, $S^{2-}$ or $Cl^-$, e.g., $Ca_{12}Al_{14}O_{32}:2OH^-$ or $Ca_{12}Al_{14}O_{32}:2F^-$, and
(4) compounds such as wadalite $Ca_{12}Al_{10}Si_4O_{32}:6Cl^-$, in which both of cations and anions are replaced.

The raw material mixture may be a mixture of compounds of elemental substances constituting the C12A7 compound, such as a mixture of calcium carbonate and aluminum oxide mixed in a predetermined composition ratio, or the raw material mixture may also be one selected from calcium aluminate compounds having various Ca/Al ratios (compounds with ratios of $CaO:Al_2O_3$ of 3:1 and 1:1 will be referred to as a C3A compound and a CA compound, respectively), glasses with compositions equivalent to those of the aforementioned compounds, and mixtures thereof.

Namely, the precursor to be used in the present invention contains Ca and/or Sr, and Al, wherein a molar ratio of a total of (CaO and SrO):$Al_2O_3$ is from (12.6:6.4) to (11.7:7.3), preferably from (12.3:6.7) to (11.9:7.1), as calculated as oxides. The total content of CaO, SrO and $Al_2O_3$ in the precursor is at least 50 mol %, preferably from 75 to 100 mol %. When the precursor has such a composition, a rate of the electroconductive mayenite type compound produced by the heat treatment, i.e., yield can be increased, which is preferable.

Furthermore, the precursor may contain another element than Ca, Sr and Al as long as the effects of the present invention are not impaired.

If the precursor contains Si, Ge and/or B, the melting temperature of the precursor is reduced to facilitate the melting, whereby the melt can be vitrified and homogenized, or molded in solidification of the melt. Therefore, the electroconductive mayenite type compound of a bulk form can be obtained in a desired size and shape. Furthermore, preparation of a glass powder becomes easier, which is preferable. When at least one member from Si, Ge and B is contained in the precursor in a range of at least 1.5 mol %, preferably in a range of from 3 to 19 mol %, in total as calculated as oxides based on the molar ratio, the above-mentioned effect can be achieved well, which is preferable. Furthermore, Si or Ge may be contained by replacement of the Al position in the electroconductive mayenite type compound produced and in this case, the doping effect provides an effect to increase the density of clathrate electrons in the compound. In order to obtain the doping effect, the precursor preferably contains them in a range of from 3 to 17 mol %, more preferably in a range of from 5 to 10 mol %. If the content of Si, Ge and/or B exceeds 17 mol %, the melting temperature might increase again or the doping effect with Si or Ge might not be obtained. Therefore, the content of Si, Ge and/or B is preferably at most 19 mol %.

Li, Na and K are components to decrease the melting temperature and at least one member out of them is preferably contained in a range of from 0 to 5 mol %, more preferably from 0 to 3 mol %, in total as calculated as oxides. If the content exceeds 5 mol %, the electroconductivity will decrease, which is not preferable.

Mg and Ba are components to decrease the melting temperature and at least one member out of them is preferably contained in a range of from 0 to 10 mol %, more preferably from 0 to 5 mol %, in total as calculated as oxides. If the content exceeds 5 mol %, the electroconductivity will decrease, which is not preferable.

Furthermore, the raw material may contain as an impurity from 0 to 8 mol %, preferably at most 1 mol %, in total as calculated as oxides, of at least one member selected from the group consisting of at least one rare earth element selected from the group consisting of Ce, Pr, Nd, Sm, Eu, Gd, Tb, Dy, Ho, Er, Tm and Yb and at least one transition metal element or typical metal element selected from the group consisting of Ti, V, Cr, Mn, Fe, Co, Ni and Cu. Namely, the raw material for preparing the precursor in the present invention may be a material prepared, for example, by blending highly pure reagents, but the raw material can also be a raw material for industrial use such as lime stone, slaked lime, quicklime, alumina, aluminum hydroxide or bauxite, aluminum residual ash, glass, or mayenite type rock as naturally produced ore.

In the present invention, the precursor with the aforementioned composition is mixed with a reducing agent powder and the mixture is subjected to heat treatment of holding the mixture at a temperature in a range of from 600 to 1,415° C. in an atmosphere with an oxygen partial pressure of at most 10 Pa, thereby preparing the electroconductive mayenite type compound. In a case where an insulating C12A7 crystal compound is used as the precursor, the aforementioned heat treatment causes a solid-phase reaction with the reducing agent so that free oxygens are withdrawn from the surface of the C12A7 compound, and free oxygen ions are transported from the interior of the precursor to near the surface. In conjunction therewith, the free oxygens are diffused near the surface and produced electrons are diffused into the interior of the precursor. Accordingly, the entire precursor is changed into the electroconductive mayenite type compound.

In a case where the aforementioned raw material mixture with a composition corresponding to the C12A7 compound is used as the precursor, the precursor is mixed with a reducing agent, and the mixture is subjected to the heat treatment, thereby preparing the electroconductive mayenite type compound, the heat treatment first produces the C12A7 compound by the solid-phase reaction between mixed raw materials and then the free oxygens are withdrawn from the C12A7 compound by the solid-phase reaction with the reducing agent, to produce the electroconductive mayenite type compound. In particular, when a mixture of calcium carbonate and aluminum oxide is used as the raw material mixture, a preferred process is such that the raw material mixture is heated once to at least 1,000° C. to precipitate the C12A7 compound in the precursor glass, in order to sufficiently promote the reaction of producing the C12A7 compound, and then the aforementioned heat treatment is carried out. Another preferred process is such that the heating temperature in the heat treatment is set in a range of from 1,000 to 1,415° C. for simultaneously bringing about the production reaction of the C12A7 compound and the withdrawing reaction of the free oxygens.

When a glass with the composition equivalent to that of the C12A7 compound is used as the precursor, the glass is preferably heated once to at least 950° C. to precipitate the C12A7 compound in the glass of the precursor contained in the mixture, and then the aforementioned heat treatment is carried out. Alternatively, the heating temperature is set preferably in a range of from 950 to 1,415° C. in the heat treatment.

If the temperature of the heat treatment is less than 600° C., a reaction rate of the withdrawing reaction of free oxygens or diffusion of free oxygens tend to slow down, so as to require a long period of time for production of the electroconductive mayenite type compound. When the temperature is at least 1,200° C., the withdrawing reaction of free oxygens is promoted, and the self-diffusion coefficient of the free oxygens in the precursor becomes remarkably large, so as to shorten the period of time for production of the electroconductive mayenite type compound, which is preferable. If the heat treatment temperature exceeds 1,415° C., the precursor will melt, which is undesirable. When the temperature is at most 1,415° C., the reaction does not go through the melt, and it becomes feasible to produce the compound with use of inexpensive apparatus.

Since the heat treatment temperature in the production method of the present invention promotes transportation of free oxygen ions, the entire precursor can be changed into the electroconductive mayenite type compound by diffusion, and therefore the precursor may be a powder, a bulk, a plate, a flake, a pressed product of the powder or a sintered body of a molded powder, or any form such as a bulk or a plate. A single crystal of the C12A7 compound in the plate form may also be used. A glass block with a thickness of about 1 cm may also be used.

The precursor is particularly preferably a powder because the electroconductive mayenite type compound is obtained with good electroconductivity by the heat treatment in a short period of time. In this case, an average particle size of the powder is preferably in a range of from 1 to 100 μm, more preferably at most 10 μm in order to obtain better electroconductivity. If the average particle size is at most 1 μm, the powder might be agglomerated by the heat treatment. The electroconductive mayenite type compound can be obtained even if precursor particles with a particle size of at least 100 μm are mixed, but when they are mixed with the reducing agent powder, a mixing condition becomes uneven and the resulting electroconductivity might be uneven, particularly, in cases where the heat treatment time is short.

When a bulk-like or plate-like glass, or a molded product or sintered product of a powder is used as the precursor, the heat treatment may be carried out in a state where the reducing agent powder is kept in contact with the surface of the precursor, whereby the entire precursor is changed into the electroconductive mayenite type compound by diffusion of free oxygens in the precursor to obtain the electroconductive mayenite type compound in the plate or bulk form.

The reducing agent to be used in the production method of the electroconductive mayenite type compound of the present invention is preferably a metal, an intermetallic compound, a metallic compound, a typical element or a typical element compound. Furthermore, in a case where the reducing agent is one of these materials in the powder form and, particularly, where the precursor is a precursor in the powder form, the electroconductive mayenite type compound is obtained with good electroconductivity by the heat treatment in a short period of time, which is preferable. When an average particle size of the reducing agent powder is at most 100 μm, it becomes easier to uniformly mix it with the precursor powder, whereby the electroconductive mayenite type compound is obtained with better electroconductivity, which is preferable. Furthermore, if the average particle size is at most 50 μm, more uniform mixing can be implemented, which is further preferable.

An example of the aforementioned typical element is carbon. When carbon reduces the precursor, it becomes a gas and goes out of the precursor so that it hardly mixes into a product, whereby the electroconductive mayenite type compound is obtained with a high purity. Therefore, carbon is preferably used. Examples of the carbon to be used include amorphous carbon, graphite, diamond, fullerene, carbon nanotubes and mixtures thereof. A rate of carbon mixed as the reducing agent is preferably from 0.2 to 11% as a rate of the number of carbon atoms relative to the total number of Ca, Sr and Al atoms. It is more preferably from 1.9 to 7.6%. If the rate is less than 1.9%, uneven reduction might occur. If the rate exceeds 7.6%, the mayenite type compound might partially decompose. When carbon is used, the heat treatment temperature is preferably at least 900° C. in order to obtain the electroconductive mayenite type compound with good electroconductivity.

Preferable examples of the metal include Al and Ti because they have the reducing property higher than that of carbon and thus readily realize a low oxygen partial pressure and they are easily available at low cost. It is, however, noted that the metal is not limited only to these examples. Especially, in a case where Al is used as the reducing agent, it is preferred that an amount of Al contained in the precursor should be reduced by the same number of Al atoms added as the reducing agent so that the composition of the mixture of the precursor and the reducing agent can be within the range of the aforementioned composition of the precursor. A preferable rate of Al to be used as the reducing agent is 0.65 to 7.4% as a rate of the number of Al atoms to be used as the reducing agent relative to the total number of Ca, Sr and Al atoms contained in the precursor. The rate is more preferably from 1.3 to 5.1% for the following reasons: if it is less than 1.3%, uneven reduction might occur; if it exceeds 5.1% on the other hand, the mayenite type compound might locally decompose. The abovementioned method of reducing the amount of Al to be incorporated in the precursor by the same number of Al atoms to be used as the reducing agent may be a method of using a mixture of a crystal powder of the C12A7 compound with quicklime or the like as the precursor and adding Al as the reducing agent into the precursor, or a method of using a mixture with a calcium aluminate compound or alumina as the precursor and mixing Al to be used as the reducing agent and the precursor, in an amount to achieve the desired composition. The latter permits easy handing of the raw material mixture and is industrially advantageous because the raw material mixture contains no hygroscopic material such as quicklime or slaked lime. From the foregoing, an example of the method of preparing the raw material mixture comprising the precursor and Al to be used as the reducing agent is to mix the C12A7 compound, the C3A compound and the aluminum metal as the reducing agent in the ratio of 4:2:3 as a molar ratio. Another example is to mix the C3A, $Al_2O_3$ and Al in the ratio of 6:4:1 as a molar ratio, but the method is not limited to these examples. The aforementioned raw material mixture is preferably a molded product made by a pressing machine because the withdrawing reaction of free oxygens is promoted.

The atmosphere for carrying out the above-mentioned heat treatment is set at an oxygen partial pressure of at most 10 Pa. If the oxygen partial pressure exceeds 10 Pa, the withdrawing reaction of free oxygens during the heat treatment cannot sufficiently take place, and the resultant electroconductive mayenite type compound will reduce its electric conductivity. When the pressure is at most $10^{-2}$ Pa, the withdrawing reaction of free oxygens is further promoted at the above-mentioned heat treatment temperature and the electroconductive mayenite type compound is obtained with better electroconductivity, which is preferred. On the other hand, if the oxygen partial pressure is less than $10^{-11}$ Pa, the effect of improving the electric conductivity of the resultant electroconductive mayenite type compound will be little. In addition, when the pressure is at least $10^{-9}$ Pa, there is no need for expensive facilities for the heat treatment under the low oxygen partial pressure or for deoxidation treatment of the ambient gas, which is more preferred.

Such a heat treatment atmosphere can be realized by flowing at least one or more gases containing no oxygen molecules, selected from the group consisting of an argon gas, a helium gas, a nitrogen gas, a carbon monoxide gas, etc., into the heat treatment furnace. It can be also realized by using a vacuum furnace to achieve a vacuum degree of at most 50 Pa. When a metal, especially aluminum, is used as the reducing agent to be mixed with the precursor, the heat treatment is preferably carried out in an atmosphere other than the nitrogen gas, and the aforementioned vacuum atmosphere is preferably applied.

The electroconductive mayenite type compound with good electroconductivity can be synthesized in good yield by applying the production method of the present invention, without need for expensive facilities, control of complicated reaction conditions, or high-temperature or long-term reaction.

EXAMPLES

Now, the present invention will be described in detail with reference to Examples, but it should be understood that the present invention is not limited thereto. Examples 1 to 3, Examples 5 to 13, and Example 15 are Examples of the present invention and Example 4 and Example 14 are Comparative Examples.

Example 1

Calcium carbonate and aluminum oxide were blended so that a molar ratio of $CaO:Al_2O_3$ became 12:7 as calculated as oxides; the mixture was held at 1,300° C. in atmospheric air for 6 hours, and then cooled to room temperature; the resulting sintered product was pulverized to obtain a powder in an average particle size of 50 μm. The resulting powder (hereinafter referred to as "powder A") was a white insulator and found to be the C12A7 compound with the mayenite type structure by X-ray diffraction.

A powder mixture obtained by mixing 0.4 part by mass of carbon powder (average particle size: 10 μm) with 100 parts by mass of the powder A was press-molded under a pressure of 200 kg/cm² to obtain a molded product (sample A) in a diameter of 3 cm and a height of 3 cm. The rate of the number of carbon atoms to the total number of Ca, Sr and Al atoms in this molded product was 1.9%. This molded product was placed in a covered carbon container, and heat treatment was carried out in such a manner that the container was heated to the temperature of 1,300° C. and held at the temperature for 2 hours in a nitrogen flow furnace in a nitrogen gas atmosphere with an oxygen concentration of 0.6% by volume.

The molded product after the heat treatment (sample B) showed deep green and it was identified as the mayenite type compound by X-ray diffraction measurement. An optical diffuse reflectance spectrum was measured and FIG. 1 shows a photoabsorption spectrum obtained through conversion by the Kubelka-Munk method. It was confirmed from the optical absorption spectrum that the sample B had a strong photoabsorption band induced with a center at 2.8 eV inherent to the electroconductive mayenite type compound and it was found from the intensity of the photoabsorption that the electron density of the sample B was $1.5 \times 10^{20}/cm^3$ and the electrical conductivity was more than 1 S/cm. The above verified that the electroconductive mayenite type compound was obtained.

Examples 2 and 3

0.8 part by mass or 1.6 parts by mass of a carbon powder (average particle size: 10 µm) was mixed in 100 parts by mass of the powder A, and each powder mixture was subjected to the same heat treatment as in Example 1, in a covered carbon container. The rate of the number of carbon atoms to the total number of Ca, Sr and Al atoms in each of the powder mixtures was 3.8% or 7.6%. Each powder after the heat treatment showed deep green and was identified as the mayenite type compound by X-ray diffraction measurement. The electron density obtained by optical diffuse reflectance measurement was found to be $1.3 \times 10^{20}/cm^3$ or $7.6 \times 10^{19}/cm^3$.

Example 4

4.0 parts by mass of a carbon powder (average particle size: 10 µm) was mixed in 100 parts by mass of the powder A and this powder mixture was subjected to the same heat treatment as in Example 1, in a covered carbon container. The rate of the number of carbon atoms to the total number of Ca, Sr and Al atoms in the powder mixture was 19.4%. The powder after the heat treatment showed white and was identified as a mixture of $CaO-Al_2O_3$ and $CaO-3Al_2O_3$, with no mayenite type compound detected by X-ray diffraction measurement. The electron density obtained by optical diffuse reflectance measurement was found to be at most $10^{19}/cm^3$.

Examples 5 to 7

A powder mixture of calcium carbonate and aluminum oxide was prepared in a common procedure, melted at 1300° C. in air and cooled by means of twin rollers, thereby obtaining a glass flake of calcium aluminate glass in a composition of C12A7 being the molar ratio of $CaO:Al_2O_3$ of 12:7. The resulting glass flake was pulverized to obtain a glass powder with an average particle size of 100 µm (hereinafter referred to as "powder B"), and 0.4, 0.8 or 1.6 parts by mass of carbon powder (average particle size: 10 µm) was mixed in 100 parts by mass of the powder B, and each powder mixture was subjected to the same heat treatment as in Example 1, except that a covered alumina container was used. The rate of the number of carbon atoms to the total number of Ca, Sr and Al atoms in each of the powder mixtures was 1.9%, 3.8% or 7.6%. Each powder after heat treatment showed deep green and was identified as the mayenite type compound by X-ray diffraction measurement. Furthermore, the electron density obtained by optical diffuse reflectance measurement was found to be $3.4 \times 10^{19}/cm^3$, $1.5 \times 10^{20}/cm^3$ or $4.6 \times 10^{19}/cm^3$. The above verified that the electroconductive mayenite type compound was obtained from the calcium aluminate glass powder as the starting raw material.

Example 8

Calcium carbonate, aluminum oxide and silicon dioxide powders were blended by a common procedure, and the mixture was melted at 1,300° C. in air and cooled by means of twin rollers, thereby obtaining a glass flake of calcium aluminate glass in a composition of 95 mol % of C12A7 and 5 mol % of $SiO_2$ being the molar ratio of $CaO:Al_2O_3:SiO_2$ of 12:7:1. the resulting glass flake was pulverized to obtain a glass powder with an average particle size of 100 µm, and 0.8 part by mass of carbon powder (average particle size: 10 µm) was mixed in 100 parts by mass of the glass powder. This powder mixture was subjected to the same heat treatment using the covered alumina container as in Examples 5 to 7 except that the heat treatment temperature was changed to 960° C. The rate of the number of carbon atoms to the total number of Ca, Sr and Al atoms in the powder mixture was 3.6%. The powder after the heat treatment showed deep green and it was identified as the mayenite type compound by X-ray diffraction measurement. Furthermore, the electron density obtained by optical diffuse reflectance measurement was found to be $1.1 \times 10^{19}/cm^3$ and it was confirmed that electroconductive mayenite type compound was obtained.

Example 9

A powder mixture obtained by mixing 0.8 part by mass of a carbon powder (average particle size: 10 µm) with 100 parts by mass of the powder A was subjected to the same heat treatment as in Examples 5 to 7. The rate of the number of carbon atoms to the total number of Ca, Sr and Al atoms in this powder mixture was 3.8%. The powder after the heat treatment showed dark green and it was identified as the mayenite type compound by X-ray diffraction measurement. The electron density obtained by optical diffuse reflectance measurement was found to be $9.2 \times 10^{19}/cm^3$ and it was confirmed that the electroconductive mayenite type compound was obtained.

Example 10

As in Example 9, a powder mixture obtained by mixing 0.8 part by mass of a carbon powder (average particle size: 10 µm) with 100 parts by mass of the powder A, was subjected to the same heat treatment as in Examples 5 to 7, except that the heat treatment temperature was changed to 1,200° C. The powder after the heat treatment showed dark green and it was identified as the mayenite type compound by X-ray diffraction measurement, the electron density was found to be $2.2 \times 10^{19}/cm^3$, and it was confirmed that the electroconductive mayenite type compound was obtained.

Examples 11 to 13

0.4, 0.8 or 1.6 parts by mass of a carbon powder (rate of numbers of carbon atoms to the total number of Ca, Sr and Al atoms being 1.9%, 3.8% or 7.6%, average particle size: 10 µm) was mixed in 100 parts by mass of the powder B, and each powder mixture was subjected to the same heat treatment as in Examples 5 to 7.

Each powder after the heat treatment showed dark green and was identified as the mayenite type compound by X-ray diffraction measurement; the electron density obtained by optical diffuse reflectance measurement was found to be $3.4 \times 10^{19}/cm^3$, $1.5 \times 10^2/cm^3$ or $4.6 \times 10^{19}/cm^3$; and it was confirmed that the electroconductive mayenite type compound was obtained.

Example 14

The powder A containing no carbon powder was subjected to the same heat treatment as in Examples 5 to 7. The powder after the heat treatment showed white and was identified as the mayenite type compound by X-ray diffraction measurement, but the electron density obtained by optical diffuse reflectance measurement was found to be less than $10^{17}/cm^3$ and it was an insulating material.

Example 15

A powder mixture obtained by mixing 1.3 parts by mass of a powder of aluminum metal (average particle size: about 50

µm) with 100 parts by mass of the powder A was press-molded as in Example 1 to obtain a molded product, and it was placed in a carbon container as opened and heat treatment was carried out in such a manner that the container was heated to 1,300° C. and held for 2 hours in a vacuum furnace vacuumized by a rotary pump. The degree of vacuum during the heat treatment was 1 Pa. The rate of the number of atoms of aluminum metal to the total number of Ca, Sr and Al atoms in the molded product was 2.6%.

The molded product after the heat treatment showed brownish black and was identified as the mayenite type compound by X-ray diffraction measurement. From optical diffuse reflectance measurement, the electron density was found to be $1.3 \times 10^{21}/cm^3$ and the electric conductivity was found to be 83 S/cm.

INDUSTRIAL APPLICABILITY

The present invention allows us to prepare the electroconductive mayenite type compound, without use of expensive facilities and in a short period of time by the low-cost process, and is thus industrially useful. Furthermore, the electroconductive mayenite type compound prepared according to the production method of the present invention can be utilized as a small-size electron emission device, display device or X-ray source, or can be further utilized as a conductor or the like required to have a special injection property, like a charge-injection material in an organic EL device.

The entire disclosure of Japanese Patent Application No. 2005-157881 filed on May 30, 2005 including the specification, claims, drawings and summary is incorporated herein by reference in its entirety.

What is claimed is:

1. A method for preparing an electroconductive compound, which comprises a step of subjecting a precursor to heat treatment,
   wherein
       the precursor contains CaO and/or SrO, and $Al_2O_3$,
       the molar ratio of a total of CaO and SrO:$Al_2O_3$ is from 12.6:6.4 to 11.7:7.3 as calculated as oxides,
       the total content of CaO, SrO and $Al_2O_3$ in the precursor is at least 50 mol %, and
       the precursor is a vitreous or crystalline material; and
   wherein the heat treatment is carried out by holding a mixture of the precursor and a reducing agent at 600-1,415° C. in an inert gas or vacuum atmosphere with an oxygen partial pressure of at most 10 Pa, where the reducing agent is selected from the group consisting of a metal, an intermetallic compound and a metallic compound.

2. The method according to claim 1, wherein the precursor is
   a mayenite compound having a composition of $12CaO.7Al_2O_3$ and having a crystal structure composed of three-dimensionally linked voids, or
   an isomorphous compound obtained by replacing part of Ca and Al in $12CaO.7Al_2O_3$ with another element.

3. The method according to claim 1, wherein part of Al contained in the precursor is replaced by the same number of Si atoms or Ge atoms.

4. The method according to claim 1, wherein the precursor contains
   from 0 to 17 mol % in total of at least one member selected from the group consisting of Si, Ge and B, as calculated as oxides;
   from 0 to 5 mol % in total of at least one member selected from the group consisting of Li, Na and K, as calculated as oxides;
   from 0 to 10 mol % in total of at least one member selected from the group consisting of Mg and Ba, as calculated as oxides; and
   from 0 to 8 mol % in total of at least one rare earth element and at least one transition metal element, where the at least one rare earth element is selected from the group consisting of Ce, Pr, Nd, Sm, Eu, Gd, Tb, Dy, Ho, Er, Tm and Yb and the at least one transition metal element is selected from the group consisting of Ti, V, Cr, Mn, Fe, Co, Ni and Cu, as calculated as oxides.

5. The method according to claim 1, wherein the precursor and the reducing agent are powders with an average particle size of at most 100 µm.

6. The method according to claim 5, wherein the powder of the reducing agent is a powder of a metal.

7. The method according to claim 6, wherein the metal is aluminum and the inert gas contains at least Ar or He.

8. The method according to claim 4, wherein the precursor contains from 3 to 17 mol % in total of at least one member selected from the group consisting of Si, Ge and B, as calculated as oxides.

* * * * *